United States Patent

Shimura et al.

Patent Number: 5,029,083
Date of Patent: Jul. 2, 1991

[54] ENERGY SUBTRACTION PROCESSING METHOD USING WEIGHTED AVERAGE OF PLURAL STACKED SHEETS FOR CREATING HIGH ENERGY IMAGE

[75] Inventors: Kazuo Shimura; Nobuyoshi Nakajima; Masamitsu Ishida, all of Kanagawa, Japan

[73] Assignee: Fuji Photo Film Co., Ltd., Kanagawa, Japan

[21] Appl. No.: 467,293

[22] Filed: Jan. 16, 1990

Related U.S. Application Data

[63] Continuation of Ser. No. 724,740, Apr. 18, 1985, abandoned.

[30] Foreign Application Priority Data

Apr. 18, 1984 [JP] Japan .................. 59-78228

[51] Int. Cl.⁵ .................. G03B 42/02; G03C 5/16; A61B 6/00
[52] U.S. Cl. .................. 364/413.23; 250/327.2
[58] Field of Search .................. 364/413.23; 358/111; 250/327.2, 484.1, 315.3, 363.01

[56] References Cited

U.S. PATENT DOCUMENTS

| 4,346,409 | 8/1982 | Ishida et al. | 364/414 |
| 4,356,398 | 10/1982 | Komaki et al. | 250/327.2 |
| 4,394,581 | 7/1983 | Takahashi et al. | 250/484.1 |
| 4,394,737 | 7/1983 | Komski et al. | 364/414 |
| 4,442,489 | 4/1984 | Wagner | 364/414 |
| 4,450,478 | 5/1984 | Ledley | 364/414 |
| 4,463,375 | 7/1984 | Macovski | 364/414 |
| 4,466,075 | 8/1984 | Groch et al. | 364/414 |
| 4,503,461 | 3/1985 | Nishimura | 364/414 |
| 4,581,535 | 4/1986 | Komaki et al. | 250/327.2 |
| 4,590,517 | 5/1986 | Kato et al. | 364/414 |
| 4,855,598 | 8/1989 | Ohgoda et al. | 364/413.23 |

FOREIGN PATENT DOCUMENTS 0089665 9/1983 European Pat. Off. .

Primary Examiner—Clark A. Jablon
Attorney, Agent, or Firm—Sughrue, Mion, Zinn, Macpeak & Seas

[57] ABSTRACT

In an energy subtraction processing for radiation images, a plurality of stimulable phosphor sheets laid one upon the other are simultaneously exposed to a radiation of high energy passing through an object, and then a different stimulable phosphor sheet is exposed to a radiation of low energy passing through the same object. Digital image signals detected from the stimulable phosphor sheets exposed to the high energy radiation are weighted and subjected to arithmetic averaging. A subtraction processing is carried out between an image signal obtained by the arithmetic averaging and an image signal detected from the stimulable phosphor sheet exposed to the low energy radiation.

3 Claims, 1 Drawing Sheet

ENERGY SUBTRACTION PROCESSING METHOD USING WEIGHTED AVERAGE OF PLURAL STACKED SHEETS FOR CREATING HIGH ENERGY IMAGE

This is a continuation of application Ser. No. 06/724740, filed Apr. 18, 1985, now abandoned.

BACKGROUND OF THE INVENTION

1. Field of the Invention

This invention relates to a method of forming an image so that a subtraction image free from noise is obtained in a subtraction processing of radiation images. This invention particularly relates to a method of forming an image so that a subtraction image free from noise is obtained in a digital subtraction processing of radiation images wherein stimulable phosphor sheets are used.

2. Description of the Prior Art

Conventionally, a digital subtraction processing method is used for processing radiation images. In the method, two radiation images recorded under conditions different from each other are photoelectrically read out to obtain digital image signals, which are then subjected to a subtraction processing with respect to the corresponding picture elements of the images, thereby to obtain a difference signal for forming an image of a specific structure contained in the radiation images. The method makes it possible to reproduce a radiation image of only the specific structure by use of the signal thus obtained.

Basically, the subtraction processing is classified into the so-called temporal (time difference) subtraction processing method and the so-called energy subtraction processing method In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations having energy distributions different from each other to obtain two radiation images respectively containing the images of a specific structure recorded on the basis of the intrinsic radiation energy absorption characteristics of the specific structure. Then, the image signals of the two radiation images are weighted appropriately when necessary, and subjected to subtraction to extract the image of the specific structure.

Since the subtraction processing is extremely effective for diagnostic purposes in image processings for medical X-ray photographs, it has recently attracted much attention, and research has continued to develop improved methods by use of electronic technology. The processing technique is specifically called the digital subtraction processing method.

A novel digital subtraction processing method has been proposed, for example, in Japanese Unexamined Patent Publication No. 58(1983)-163340. The method comprises the steps of (i) using two or more stimulable phosphor sheets exhibiting an extremely wide latitude of exposure to a radiation, (ii) exposing the stimulable phosphor sheets to the radiation passing through the same object under different conditions to have radiation images of the object stored in the stimulable phosphor sheets, image information of the specific structure being different between the radiation images, (iii) detecting the radiation images by scanning the stimulable phosphor sheets with stimulating rays to obtain digital image signals, and (iv) conducting a digital subtraction processing by use of the digital image signals. The stimulable phosphor sheets comprise a stimulable phosphor which is able to store a part of the radiation energy when exposed to a radiation such as X-rays, $\alpha$-rays, $\beta$-rays, $\gamma$-rays, cathode rays of ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when the digital subtraction processing is conducted by use of the radiation images stored in the stimulable phosphor sheets, it is possible to obtain a radiation image having an improved image quality, particularly a high diagnostic efficiency and accuracy, regardless of the amount of radiation to which the stimulable phosphor sheets are exposed.

As one of the methods of obtaining two original images subjected to the energy subtraction processing conducted by use of the stimulable phosphor sheets, there has heretofore been known a method wherein the stimulable phosphor sheets are changed quickly at the image recording position and are exposed to a radiation of high energy and, approximately at the same timing, the object is exposed to a radiation of high energy and a radiation of low energy which are switched over quickly, so that radiation images of the object corresponding to these radiations are stored in the respective stimulable phosphor sheets. For simplicity, this method is hereinafter called the double exposure method. However, when the double exposure method is conducted, the radiation of high energy readily passes through the stimulable phosphor sheet, and the amount of radiation energy absorbed by the stimulable phosphor sheet becomes small. Therefore, the radiation image (high energy image) obtained with the radiation of high energy contains a high level of noise, and a subtraction image obtained thereby contains much noise and exhibits a low image quality, particularly a low diagnostic efficiency and accuracy.

SUMMARY OF THE INVENTION

The primary object of the present invention is to provide an image forming method for obtaining original images free from noise in the energy subtraction processing conducted by use of the double exposure method.

Another object of the present invention is to provide an image forming method in the energy subtraction processing wherein radiation images of an object are recorded with low exposure doses.

The present invention provides an image forming method in an energy subtraction processing for radiation images including the steps of exposing the same object to a radiation of high energy and a radiation of low energy at different points of time to have said radiation of high energy and said radiation of low energy passing through said object respectively absorbed by separate stimulable phosphor sheets and to have radiation images of said object stored in said stimulable phosphor sheets, at least a part of the image information being different between said radiation images, scanning the respective stimulable phosphor sheets by stimulating rays to sequentially release the radiation energy stored in said stimulable phosphor sheets as light emission, photoelectrically detecting and converting the amounts of the emitted light into digital image signals, and obtaining a difference signal for forming an image of a specific structure contained in at least one of said radiation images by carrying out a subtraction processing of said digital image signals between corresponding picture elements of said radiation images, the image forming method comprising the steps of: having at least said radiation of high energy passing through said object absorbed by a plurality of stimulable phosphor sheets laid one upon the other, subjecting digital image signals detected from a plurality of said stimulable phosphor sheets to arithmetic averaging, and using an image signal obtained by said arithmetic averaging for said subtraction processing.

When a plurality of stimulable phosphor sheets are exposed simultaneously to the radiation passing through an object, the radiation passing through the first stimulable phosphor sheet is sequentially absorbed by the subsequent stimulable phosphor sheets. Thus the radiation is efficiently absorbed by the stimulable phosphor sheets. By generating the image signals by use of the stimulable phosphor sheets which have efficiently absorbed the radiation, it is possible to obtain an original image free from noise. Further, since the image signal obtained by arithmetic averaging of the digital image signals detected from a plurality of the stimulable phosphor sheets is used in the subtraction processing, it is possible to conduct the subtraction processing by correctly detecting the difference between the image recorded with the radiation of high energy and the image recorded with the radiation of low energy even when the number of the stimulable phosphor sheets used for image recording with the radiation of high energy is different from that in image recording with the radiation of low energy.

In the present invention, the digital image signals detected from a plurality of the stimulable phosphor sheets absorbing the radiation of high energy should preferably be weighted and then subjected to arithmetic averaging. In this case, weighting is carried out in accordance with, for example, the amounts of light emission and granularity values of the stimulable phosphor sheets.

As the granularity values, a square mean value of noise or the like may be used.

In the present invention, it is possible to use a plurality of stimulable phosphor sheets also at the step of recording the radiation image (low energy image) by use of the radiation of low energy, and to obtain an image signal for the subtraction processing in the same manner as described above. In this case, the level of noise in the low energy image becomes low, and noise in the subtraction image obtained by the subtraction processing is further decreased.

Another method of improving the high-energy radiation absorption efficiency of the stimulable phosphor sheet is to increase the thickness of the stimulable phosphor layer of the stimulable phosphor sheet. However, when the thickness of the stimulable phosphor layer is increased extremely, the ratio of the amount of light emitted by the stimulable phosphor sheet to the amount of radiation energy absorbed by the sheet becomes much lower than when the stimulable phosphor layer is thin. Further, since the image read-out apparatus for detecting the radiation image stored in the stimulable phosphor sheet is generally designed for stimulable phosphor sheets having thickness within a predetermined range, the stimulable phosphor sheet provided with a very thick stimulable phosphor layer cannot be used in the image read-out apparatus. Therefore, the method of increasing the thickness of the stimulable phosphor layer of the stimulable phosphor sheet is not suitable for actual practice.

In the present invention, the thickness of the plurality of the stimulable phosphor sheets used for recording the high energy images need not necessarily be the same, and may differ slightly insofar as the ratio of the amount of light emission to the amount of radiation energy absorbed does not substantially change.

In the image forming method in an energy subtraction processing in accordance with the present invention, it is possible to obtain a subtraction image free from noise and having an improved image quality, particularly a high diagnostic efficiency and accuracy. Particularly, in the subtraction processing wherein an image of bone is erased, since the degree of weighting on the high energy image side in the subtraction processing operation is high, a marked noise reducing effect is obtained by use of the method of the present invention. Further, since radiation energy is efficiently utilized for image recording, it becomes possible to decrease the radiation exposure dose to the object, the human body for example.

DESCRIPTION OF THE PREFERRED EMBODIMENTS

The present invention will hereinbelow be described in further detail with reference to the accompanying drawings.

Figure 1A:
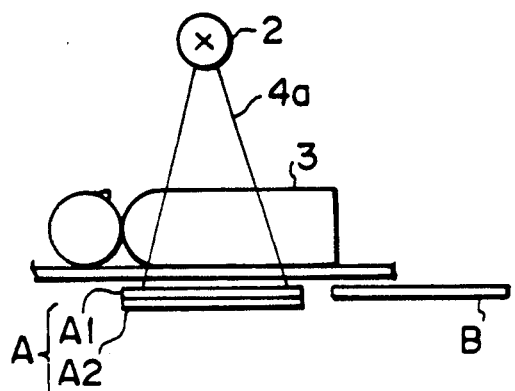
FIGS. 1A and 1B are explanatory views showing the radiation image recording step in the image forming method in accordance with the present invention.
Figure 1B:
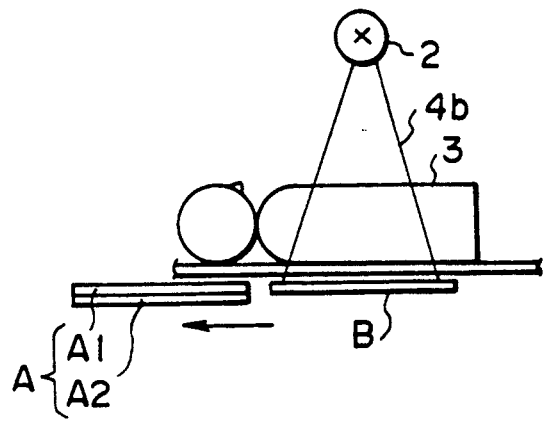

FIGS. 1A and 1B show an embodiment of the image forming method in an energy subtraction processing in accordance with the present invention. First, as shown in FIG. 1A, stimulable phosphor sheets A for a high energy image are exposed to X-rays 4a emitted by an X-ray source 2 and passing through an object 3. By way of example, the stimulable phosphor sheets A for a high energy image comprises stimulable phosphor sheets A1 and A2 laid one upon the other. The tube voltage of the X-ray source 2 is adjusted to, for example, 120 kVp so that the X-rays 4a have comparatively high energy.

Then, as shown in FIG. 1B, the stimulable phosphor sheets A for a high energy image are quickly removed from the image recording position, and a stimulable phosphor sheet B for a low energy image is quickly moved to the image recording position. At the same time, the tube voltage of the X-ray source 2 is changed to, for example, 60 kVp and the stimulable phosphor sheet B for a low energy image is exposed to X-rays 4b of comparatively low energy passing through the object 3. The stimulable phosphor sheet B for a low energy image is constituted by a single stimulable phosphor sheet. Instead of changing the tube voltage of the x-ray source 2, a filter may be positioned between the X-ray source 2 and the object 3 and may be changed over for changing the level of X-ray energy.

Figure 2:
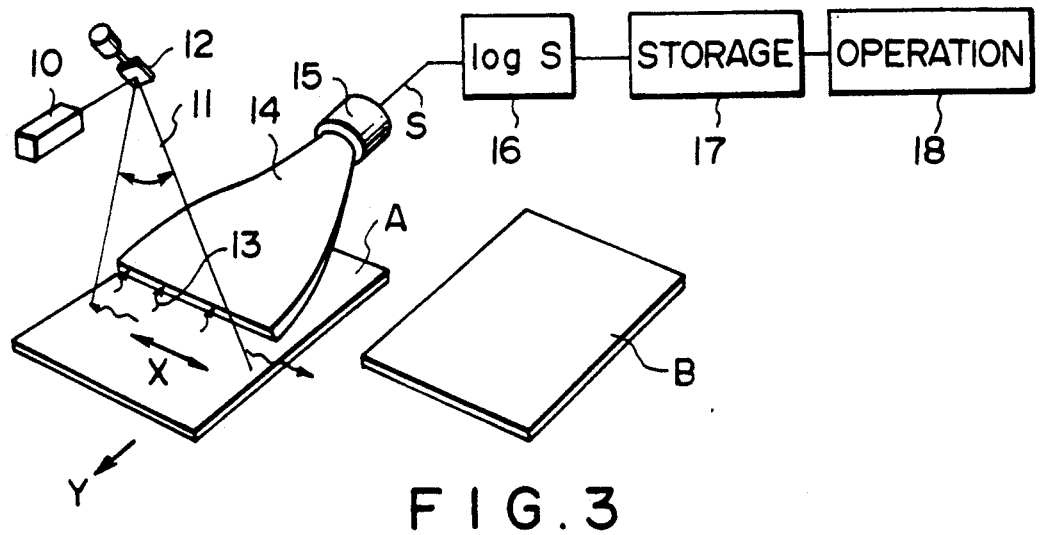
FIG. 2 is a schematic view showing the step of reading out radiation images from stimulable phosphor sheets carrying the radiation images stored therein as shown in FIGS. 1A and 1B.

From the stimulable phosphor sheets A and B carrying the X-ray images stored therein, the X-ray images are read out by use of an image read-out means as shown in FIG. 2 to obtain digital image signals representing the X-ray images. First, while the stimulable phosphor sheet A1 is moved in the direction as indicated by the arrow Y to conduct sub-scanning, a laser beam 11 emitted by a laser beam source 10 is deflected in the direction as indicated by the arrow X by a scanning mirror 12 to conduct main scanning. In this manner, the stimulable phosphor sheet A1 is caused to release the X-ray energy stored therein as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is outputted as an image signal S by the photomultiplier 15. The image signal S is then converted into a digital image signal logSA1 of a logarithmic value (logS) by a log-converter 16 comprising an amplifier and an A/D converter. The digital image signal logSA1 is stored in a storage medium 17 such as a magnetic tape. Thereafter, the X-ray images stored in the other stimulable phosphor sheet A2 for a high energy image and the stimulable phosphor sheet B for a low energy image are read out therefrom in exactly the same manner as described above, and digital image signals logSA2 and logSB thus obtained are stored in the storage medium 17.

Thereafter, a subtraction processing is conducted by use of the digital image signals logSA1, logSA2 and logSB obtained as described above. First, the digital image signals logSA1, logSA2, and logSB are read from the storage medium 17 and sent to a subtraction operation circuit 18. The subtraction operation circuit 18 carries out weighting and arithmetic averaging of the digital image signals logSA1 and logSA2 detected from the stimulable phosphor sheets A1 and A2 for a high energy image to obtain a digital image signal logSA as expressed by the formula $$logSA = (a \cdot logSA1 + b \cdot logSA2)/(a+b)$$

where a and b denote weight factors for the digital image signals logSA1 and logSA2 for minimizing noise of the digital image signal logSA. For example, the weight factors a and b are adjusted in accordance with the light emission amounts and granularity values of the stimulable phosphor sheets A1 and A2 for a high energy image. The weight factors a and b may be adjusted in advance by conducting image recording by use of a phantom or the like, measuring the light emission amounts or the granularity values of the stimulable phosphor sheets A1 and A2, and presetting the weight factors on the basis of the measured values. Or, the light emission amounts or the granularity values of the stimulable phosphor sheets A1 and A2 may be measured each time actual image recording is carried out, and the weight factors a and b may be adjusted on the basis of the measured values at each image recording step. However, the method of adjusting the weight factors is not limited to the method wherein they are adjusted on the basis of the light emission amounts or the granularity values of the stimulable phosphor sheets A1 and A2, and any other method may be employed.

Then, the subtraction operation circuit 18 weights the digital image signal logSA representing the high energy image and the digital image signal logSB representing the low energy image obtained as described above by use of weight factors c and d, and conducts a subtraction processing between the digital image signals logSA and logSB with respect to the corresponding picture elements to obtain a digital difference signal Ssub as expressed by $$Ssub = c \cdot logSA - d \cdot logSB + 3$$

where c, d and e are constants. The constant e is a bias component for adjusting the density of the difference signal Ssub approximately to a predetermined value. When a specific structure of the object 3 exhibits different absorption characteristics to the radiation of high energy and the radiation of low energy, the difference signal Ssub represents only the specific structure, and it is possible to extract an image of only the specific structure by use of the difference signal Ssub.

Figure 3:
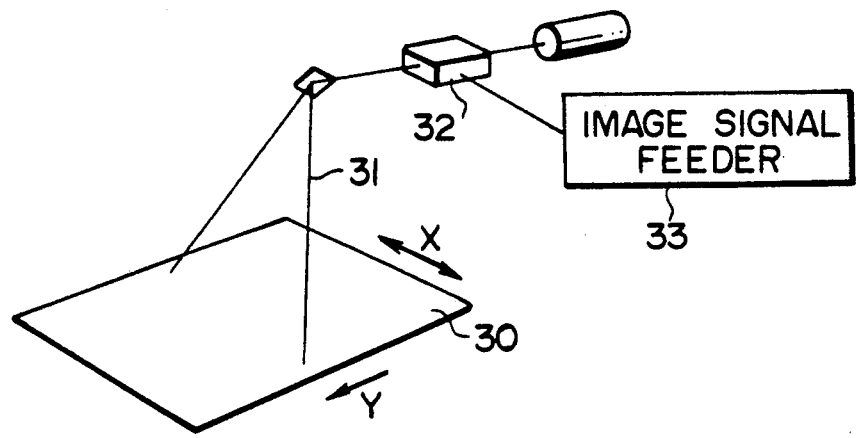
FIG. 3 is a schematic view showing an example of the subtraction image reproducing system.

The difference signal Ssub is subjected to a signal processing such as a gradation processing, and is then sent to an image reproducing apparatus, for example, a display device such as a cathode ray tube (CRT) or a point-by-point scanning apparatus which reproduces a subtraction image by use of the difference signal Ssub. FIG. 3 shows an apparatus for reproducing the image by point-by-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction as indicated by the arrow X. The laser beam 31 is modulated by an A/O modulator 32 with an image signal sent from an image signal feeder 33, thereby to form a visible image on the photosensitive film 30. By using the difference signal Ssub as the modulating image signal, it is possible to reproduce on the photosensitive film 30 a visible image wherein only the specific structure is extracted by the digital subtraction processing.

Though the X-rays 4a of high energy readily pass through the stimulable phosphor sheet used for image recording, since the stimulable phosphor sheets A1 and A2 are used as the stimulable phosphor sheets A for a high energy image, the X-rays 4a passing through the stimulable phosphor sheet A1 are absorbed by the next stimulable phosphor sheet A2. Therefore, the X-rays are efficiently utilized for image recording, and the digital image signal logSA obtained from the stimulable phosphor sheets A1 and A2 is free from noise. As a result, the subtraction image obtained by use of the digital image signal logSA becomes free from noise.

While the single stimulable phosphor sheet B is used for recording the low energy image, the stimulable phosphor sheets A1 and A2 are used for recording the high energy image, and more X-rays are absorbed in the stimulable phosphor sheets A1 and A2, since the digital image signals logSA1 and logSA2 obtained from the stimulable phosphor sheets A1 and A2 are weighted, subjected to arithmetic averaging and then used for the subtraction processing as described above, the energy subtraction processing is carried out by correctly detecting the difference between the high energy image and the low energy image.

In the present invention, it is possible to use a plurality of the stimulable phosphor sheets also for recording the low energy image and to use an image signal obtained by conducting weighting and arithmetic averaging of digital image signals detected from the stimulable phosphor sheets for the subtraction processing. Further, three or more stimulable phosphor sheets may be used for recording of the high energy image and/or recording of the low energy image. In general, when the thickness of the stimulable phosphor sheets is the same, the number of the stimulable phosphor sheets used for recording the low energy image may be smaller than the number of the stimulable phosphor sheets used for recording the high energy image.

In the aforesaid embodiment, the digital image signals detected from a plurality of the stimulable phosphor sheets for recording the high energy image are weighted and then subjected to arithmetic averaging. However, the weighting need not necessarily be conducted in the method of the present invention. When the weighting is not conducted, the relationship $a=b=1$ holds in the aforesaid formula of arithmetic averaging. However, in general, the digital image signals detected from a plurality of the stimulable phosphor sheets for recording the high energy image should preferably be weighted prior to arithmetic averaging.

We claim:

1. An image forming method in an energy subtraction processing for radiation images, the image forming method comprising the steps of:
   i) exposing an object to a radiation of high energy at a first point in time and exposing the same object to a radiation of low energy at a second point in time different from the first point in time, whereby said radiation of high energy and said radiation of low energy will pass through said object:
   ii) absorbing said radiation of high energy which has passed through said object simultaneously in a plurality of stimulable phosphor sheets laid one upon the other, whereby each sheet of said plurality of stimulable phosphor sheets stores radiation energy with respect to said radiation of high energy, and absorbing said radiation of low energy which has passed through said object in a separate stimulable phosphor sheet, whereby the radiation images of said object will be stored in said plurality of stimulable phosphor sheets and said separate stimulable phosphor sheet, at least a part of the image information being different between said radiation images;
   iii) scanning, the respective stimulable phosphor sheets by stimulating rays, for sequentially releasing the radiation energy stored in said plurality of said stimulable phosphor sheets and in said separate stimulable phosphor sheet as light emission;
   iv) photoelectrically detecting and converting the amounts of the emitted light from said plurality of sheets and said separate sheet into a plurality of digital image signals and a separate digital image signal, respectively;
   v) weighting said plurality of digital image signals obtained from said plurality of said stimulable phosphor sheets and arithmetically averaging said plurality of digital image signals which have been weighted to obtain a weighted average digital image signal with respect to said plurality of digital image signals; and
   vi) obtaining a difference signal for forming an image of a specific structure contained in at least one of said radiation image signals between corresponding picture elements of said radiation images, wherein said weighted average image signal obtained by said arithmetic averaging is used in said step of obtaining said difference signal in said energy subtraction processing.

2. A method as defined in claim 1 wherein said weighting is conducted in accordance with the light emission amounts of the respective stimulable phosphor sheets.

3. A method as defined in claim 1 wherein said weighting is conducted in accordance with the granularity values of the respective stimulable phosphor sheets.

* * * * *